United States Patent [19]

Arambepola

[11] Patent Number: 4,967,200

[45] Date of Patent: Oct. 30, 1990

[54] PROCESSOR FOR RADAR SYSTEM

[75] Inventor: Bernard Arambepola, Essex, United Kingdom

[73] Assignee: The General Electric Company, p.l.c., London, United Kingdom

[21] Appl. No.: 269,732

[22] Filed: Nov. 10, 1988

[30] Foreign Application Priority Data

Nov. 11, 1987 [GB] United Kingdom ............... 8726390
Feb. 9, 1988 [GB] United Kingdom ............... 8802906
Apr. 27, 1988 [GB] United Kingdom ............... 8809950

[51] Int. Cl.$^5$ .................... G01S 13/90; G01S 7/295
[52] U.S. Cl. .................... 342/25; 342/189; 342/195
[58] Field of Search .............................. 342/25

[56] References Cited

U.S. PATENT DOCUMENTS 4,219,811  8/1980  Herman et al. .................... 342/25
4,471,357  9/1984  Wu et al. .................... 342/25

OTHER PUBLICATIONS

E. Shaw, "*A Quick-Look SEASAT SAR Digital Processor*" Instrumentation for Preprocessing of SAR Data to Image Form pp. 39–41, Sep. 1980. (TK 6592.595 E8 1979).

*Primary Examiner*—Gilberto Barrón, Jr.
*Attorney, Agent, or Firm*—Spencer & Frank

[57] ABSTRACT

In a synthetic aperture radar system the radar pulse echo return signals are sample, which samples are correlated with a replica of the original signal to produce range line samples with increased resolution in the range direction. To increase resolution in the azimuth direction, a series of range lines are correlated or combined in some other way with Doppler or other reference-coefficents a problem with this is that there is relative movement between any particular point on the ground and the radar system, and the samples in the range lines corresponding to that position lie on a slant line such as 103 (skew axis y). To utilize the incoming data, the skew axis is arranged in a saw-tooth form. To facilitate processing data is fed into an input sequence of data storage location in for example a buffer 51, at a variable starting position which moves corresponding to each discontinuity in the zig-zag, so that the discontinuities are transparent to the processor. In one embodiment, azimuth processing can take place along columns in bands 83 in a two-dimensional memory 53 corresponding to swaths on the ground 101.

17 Claims, 13 Drawing Sheets

PROCESSOR FOR RADAR SYSTEM

BACKGROUND OF THE INVENTION

This invention relates to a processor for a radar system, particularly for a synthetic aperture radar (SAR) system.

Synthetic aperture radar is a known technique which is suitable for producing a high resolution radar image of a terrain under a moving radar platform, e.g. an aircraft or satellite. A typical synthetic aperture radar system will now be described with reference to FIGS. 1 and 2 of the accompanying drawings.

Referring to FIG. 1, the system comprises a radar carried on a moving platform 1, which looks approximately sideways to the path of motion 3 of the platform 1. As the platform moves along the path 3, the radar periodically transmits radar pulses and collects the echoes. A pulse illuminates an area 5 of the terrain beneath the platform, which is commonly referred to as the radar footprint. The collected radar echoes are processed by the radar system to produce the required radar image.

As the platform moves along the path 3, the footprint moves along a strip 7 of the terrain referred to as the illuminated swath, the direction along the length of the swath being referred to as the azimuth direction and the direction across the width of the swath being referred to as the range direction. Radar echoes are received in the time between successive radar pulses, as shown in FIG. 2, in a data reception window 11, and the echo signal is sampled (range line).

The resolution of the image obtained in the range direction is primarily determined by the bandwidth of the transmitted pulse, a high resolution being obtained with a high bandwidth pulse using known range processing algorithms, which correlate the range lines with a replica of the transmitted pulse signal.

High resolution can be obtained in the azimuth direction by choosing the pulse repetition interval such that successive footprints overlap. The range line signals obtained from each set of overlapping footprints are processed simultaneously (being correlated or combined in another suitable relation with data relating to the Doppler shift of the echo signals) and in this way, an azimuth resolution comparable to that obtainable with an antenna of much larger size and aperture is obtained.

A problem with such azimuth processing is the so-called range migration effect under which the distance between the platform and a point on the terrain illuminated by the beam changes from pulse to pulse. Consequently any such point is represented by range line samples at different positions on successive range lines, the positions defining a range migration path, which may be curved, or substantially linear. Since the correlation with the Doppler coefficients has to be carried out on data samples on the range migration paths, the range migration effect must be taken into account to perform the processing.

U.S. Pat. No. 4132989 is a proposal for range migration correction in azimuth processing, which entails the use of a number of shift registers, one for each sample range line, connected in cascade. Range migration correction is performed by applying a variable delay to the output of each shift register. The delayed outputs (corresponding to the same point on the ground) are then correlated with the Doppler reference coefficients.

To simplify the processing, it has been proposed in situations where the range migration curvature is not great, to approximate it to a straight line. For example, by a co-ordinate transformation, additional samples can be interpolated for each range line such that the points lie on slant or skew axes parallel to the straight line approximation of the range migration curve, rather than on axes parallel to the azimuthal direction. The points lying on the skew axes can then be correlated with the Doppler reference coefficients.

However, a disadvantage with this is that the original sample data lying in the included angle between the skew axis and the azimuthal axis will not be processed.

The applicants have realised that the advantages of straight line approximation and the maximum utilisation of data can be both achieved if data line samples commence from a skew axis of saw-tooth form in the region of the included angle.

The invention provides an azimuth processor for a synthetic aperture radar system, which comprises a sequence of data storage locations, and means for entering successive range line samples derived from successive radar echo signals into the sequence of storage locations, at a variable starting location along the sequence.

The starting location at which successive range line samples are entered can be changed so that the discontinuities in the saw-tooth form of data will be transparent to the processor, enabling the processing advantages of this form of data to be achieved.

The range line samples entered into the sequence of storage locations may be samples of radar return samples after range processing e.g. by correlation with a replica of the transmitted pulse.

Advantageously, columns of data are derived from the data successively fed into the input sequence of data storage locations, Thus, the data may be transferred from the input sequence to a two-dimensional array of storage locations, and samples may be read from the array for azimuth processing. The array may be divided into modules. The relative lengths of rows and columns in the array may be variable, in order to trade the length of the swath being measured against the azimuth resolution provided within that swath. The two dimensional array may be formed by a data memory which could also include the input row and/or an output row.

The processor may include a linear range migration interpolator for performing a co-ordinate transformation to interpolate samples on a co-ordinate axis system in which one axis is skew compared to the azimuth direction. Such a co-ordinate transformation enables azimuth processing to be carried out along columns in the two-dimensional array where the range migration is linear (and indeed even the co-ordinate transformation would be unnecessary if there was no range migration). However, if the range migration path also has a non-linear component azimuth processing can take place along range migration curves by use of a further range migration processor of the form described and claimed in our co-pending application Ser. No. 07/233,251 filed Aug. 17th, 1988, now U.S. Pat. No. 4,879,559. Alternatively, the curvature can be approximated to a series of linear sections, and azimuth processing can be carried out on samples interpolated by the linear range migration interpolator on skew axes parallel to each linear section. The results can be combined to yield azimuth processed samples.

The sequence of data storage locations may be arranged in the form of a closed loop, in that the entire sequence will be filled and in the same order, irrespective of the starting position. Thus, in the case of a row, after the row has been filled from the starting point to the end, the storage locations at the start of the row are filled in succession. Advantageously, the storage locations are configured as a plurality of groups, and successive range line samples are fed in use to a location in each group in turn. This gives processing advantages, because when columns of data derived from the data successively fed into the groups are azimuth processed, columns of data derived from the different groups will require the same reference coefficients at any given time for azimuth processing. This enables the necessary reference coefficients to be stored in a single memory. An output row of storage locations for processed data may be provided, which can be read from a variable starting point along the row which may move in step with that for the input row: this provides output data in the same structure as the input data. The input row could be part of an input buffer, which could consist only of that row, or could consist of more than one row. Equally, the output row of storage locations could be part of an output buffer, which could consist only of that row, or could consist of more than one row.

Instead of sequence of storage locations being filled by a moving pointer, the sequence of storage locations may be formed by a shift register.

The invention also provides an azimuth processor for a synthetic aperture radar system, comprising means for performing a co-ordinate transformation on range line samples derived from successive radar echo signals, so that samples are interpolated on a skew axis parallel to a straight line approximation of the range migration curve, and means for azimuth processing such data wherein the skew axis is of saw-tooth form.

The invention also provides a processor for two-dimensional separable convolution/correlation of an array of samples, comprising a correlator or convolver to correlate or convolve each line of input samples from the array, a sequence of data storage locations for storing the correlated or convolved lines of samples, a two-dimensional array of storage locations arranged to receive successive rows of samples from the data storage locations, and correlators or convolvers arranged to correlate or convolve the samples in the columns in the array.

BRIEF DESCRIPTION OF THE DRAWINGS

The invention will now be described by way of example with reference to the accompanying drawings in which:

FIG. 10b shows a typical series of range line samples on a range/y co-ordinate system which forms the input for the processor of FIG. 10a;

DETAILED DESCRIPTION OF THE PREFERRED EMBODIMENTS

Figure 3:
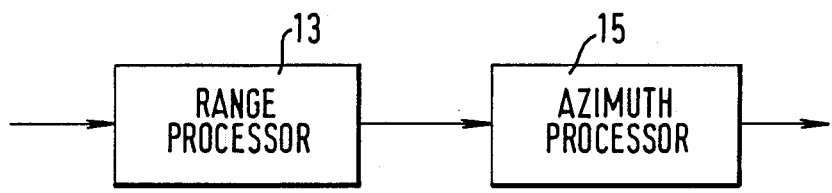
FIG. 3 is a block diagram of a basic arrangement of a processing circuit.

The SAR processing is carried out in two stages, namely, range processing 13 and azimuth processing 15, shown in FIG. 3, but the azimuth processing may be performed first if desired. Range processing can be implemented using the correlator architecture described in a companion United Kingdom patent application No. 88 02904 now U.K. Pat. No. 2,215,096. The processing can be carried out at high speed, preferably real time, permitting incorporation on the moving radar platform.

The SAR azimuth processor described here operates on sampled data sequences. Hence, it is assumed that each radar echo signal (possibly range processed) is available to the azimuth processor as a sequence of data samples, referred to as a range line. The data samples in range lines are considered to be complex-valued, comprising real and imaginary components.

Figure 1:
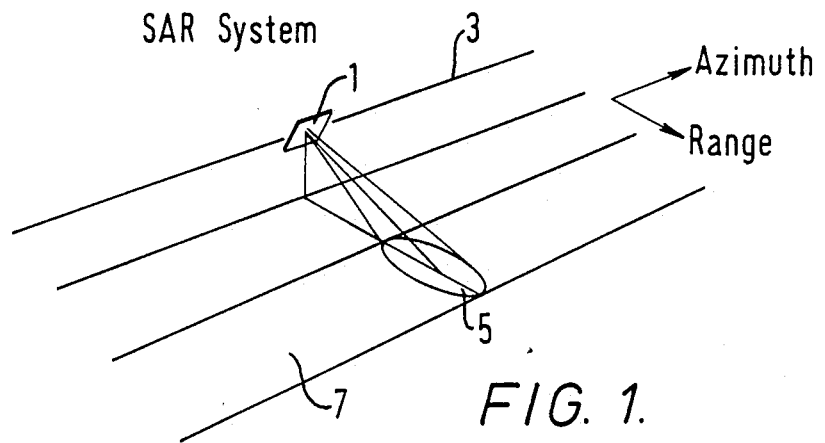
FIG. 1 illustrates the footprint from an SAR system.
Figure 2:
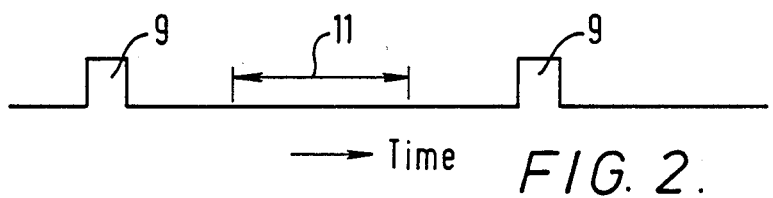
FIG. 2 illustrates the output and echo return radar pulses.
Figure 4:
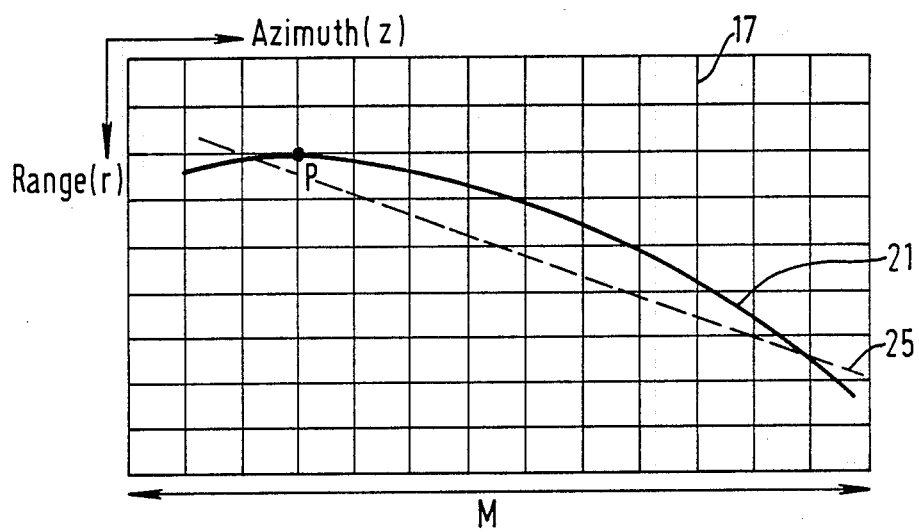
FIG. 4 shows a series of range processed range line samples in a range/azimuth co-ordinate system.
Figure 5:
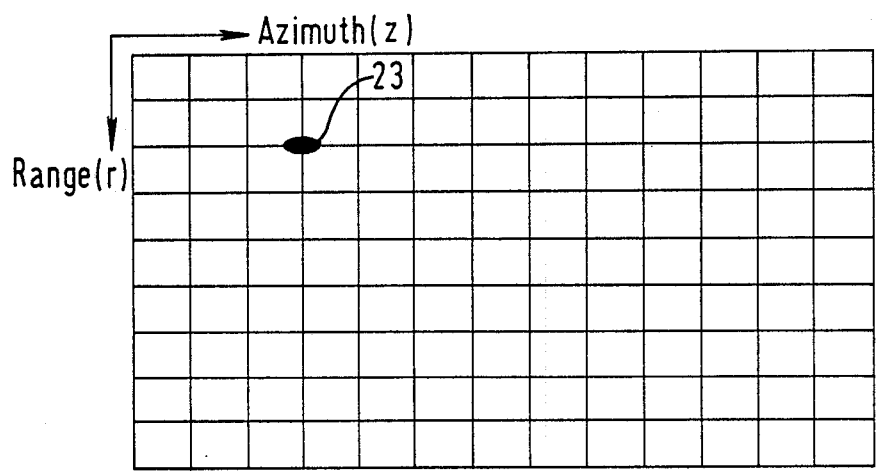
FIG. 5 shows the data of FIG. 4 after azimuth processing.

SAR azimuth processing is now described referring to FIGS. 4 and 5 Since the footprints of many radar pulses overlap, a point target P on the terrain will respond to many successive radar pulses. Hence, if the echoes, or the range lines 17, are placed next to each other to form a two-dimensional data structure, as shown in FIG. 4, the responses of the point target P to the radar pulses will take the form of a trajectory 21. It is assumed that range processing has been carried out to compress the dispersion of the response of P along each range line 17. In general, the trajectory 21 will not be a straight line parallel to the azimuth direction, owing to the effect known as range migration. This range migration effect is caused by changes in the distance between the radar platform 1 (FIG. 1) and the point target P, as the platform moves over the target. Azimuth processing for point P is basically a correlation of the signal along the trajectory 21 with the appropriate reference sequence. The effect of this correlation is to compress the spread of the target energy along the trajectory 21 into a relatively small area 23. This operation is repeated for every point of the two-dimensional grid of FIG. 4. This is known as azimuth processing and yields an SAR image with a high resolution in &he azimuth dimension.

For some SAR systems, the curvature of the range migration trajectory 21 of FIG. 4, is negligibly small. Hence the range migration trajectory can be represented as the straight line 25 in FIG. 4. For cases where the range curvature is not negligible, it is possible to approximate the range migration trajectory by several straight lines, i.e. to consider 21 as a piecewise linear trajectory. Then azimuth correlation can be carried along lines parallel to each of these linear sections separately and the results of these correlations can be added with appropriate delays between them, to give the complete azimuth processed SAR image. Separate azimuth processors may be provided, one for each linear section direction, or the same processor may be used for each direction in succession. Hence the basic requirement of the azimuth processor is to correlate signal values in a linear trajectory 25 with a reference sequence and to repeat this for every point in the two dimensional grid.

Figure 6:
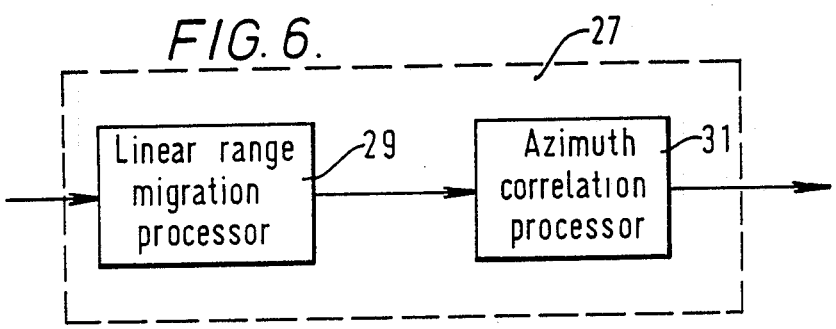
FIG. 6 is a block diagram of a basic arrangement of an azimuth processor.

SAR azimuth processing is carried out using an algorithm which involves interpolating to obtain data samples along range migration lines 25 and then correlating the data in these lines with appropriate reference sequences. Hence the SAR azimuth processor 27 of FIG. 6, consists of a linear range migration processor 29 and an azimuth correlation processor 31. The linear range migration processor 29 consists of an interpolator.

Figure 7A:
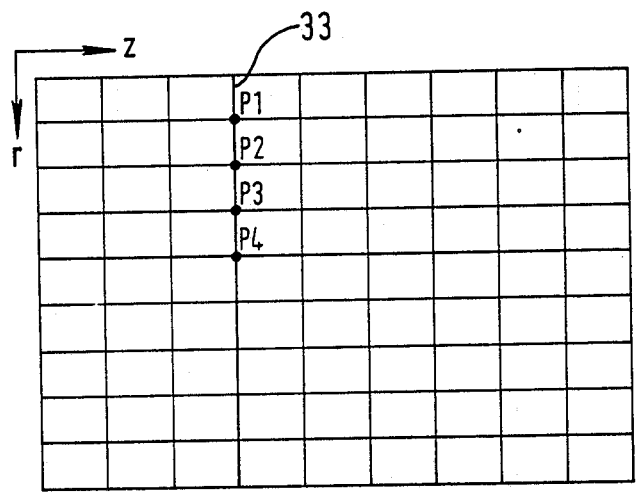
FIG. 7a shows a series of range line samples on a range/azimuth co-ordinate system.
Figure 7B:
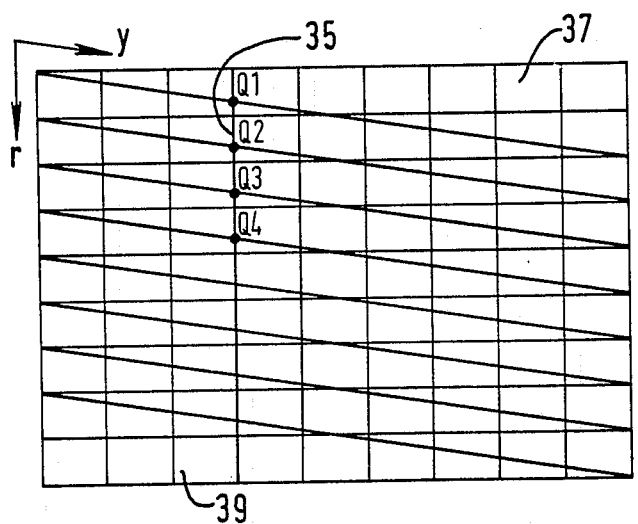
FIG. 7b shows a series of range line samples on a range/y co-ordinate system.
Figure 8:
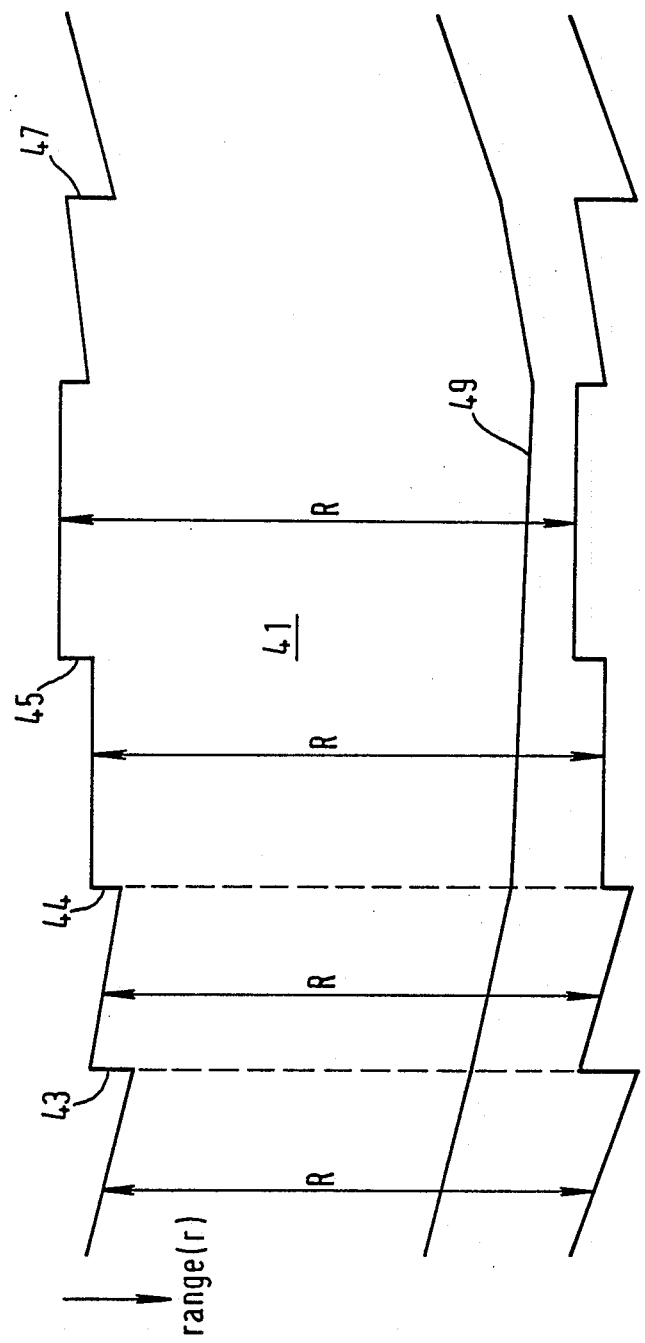
FIG. 8 shows another system of range line samples on a range/y co-ordinate system.

The function of the linear range migration processor 29 is now described with references to FIGS. 7 and 8. The sampled range line data is available on a range (r)-azimuth (z) grid, as shown in FIG. 7a. However, the azimuth correlation processor 31 has to carry out azimuth correlations along linear range migration lines 25. The axis y, shown in FIG. 7b, is defined as a co-ordinate axis parallel to range migration line 25 of FIG. 4. The function of the linear range migration processor is to transform data samples located on a r-z grid into data samples located on a r-y grid. This is done to allow the azimuth correlation processor 31 to correlate data along lines parallel to the y-axis. This is achieved by interpolations along range lines i.e. obtaining data samples for points Q1,Q2,Q3 etc. from data at points P1,P2,P3 etc.

If the linear range migration processing operation described above is carried out for a relatively long period, a relatively large amount of SAR data in areas 37 and 39 of FIG. 7b will not be processed and hence an image corresponding to this data will not be formed. The Applicants have appreciated that processing of most data in areas 37 and 39 of FIG. 7b can be achieved by arranging that the range migration processor 29 provides the azimuth processor with interpolated data in a saw-tooth edged region 41 as shown in FIG. 8. The saw-tooth discontinuities 43, 44 and 47 occur due to linear range migration. It may be observed that the discontinuities 43 and 47 are in opposite directions. This is because of the change in the sign of the slope of the linear range migration 25. Changes in the slope of the linear range migration may occur. The discontinuity 45 is caused by a change in the radar reception window 11.

The new architecture of the azimuth correlation processor 31 will now be described with reference to FIGS. 9 to 12.

Figure 9:
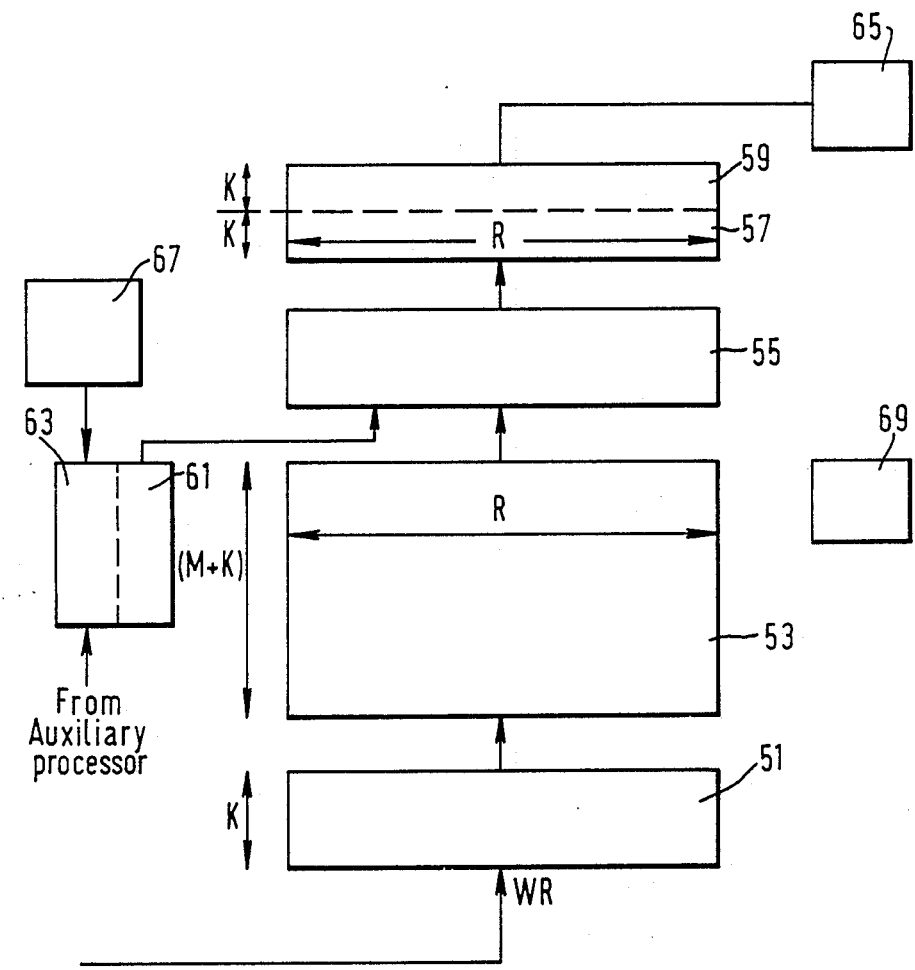
FIG. 9 is a block diagram of a basic scheme of an azimuth processor.

A functional block diagram of the azimuth correlation processor 31 is shown in FIG. 9. This processor consists of an input buffer 51, a data memory 53, a data processor 55, an output buffer (57,59), coefficient memory (61,63), an output interpolater 65, an auxiliary processor 67 and a system controller 69.

Data from the linear range migration processor are entered in range line order into the input buffer 51. This data then gets transferred to the data memory 53. The data processor 55 processes the data in the data memory 53 using the coefficients in the coefficient memory (61,63) and stores the results in the output buffer (57,59). The processed data is extracted from the output buffer (57,59) in range line order and then interpolated using the interpolator 65 and presented at the output. The auxiliary processor 67 generates the coefficients required for data processing using algorithms. The complete system is controlled by the controller 69.

Data is processed in the azimuth correlation process in blocks of K range lines.

The input buffer 51 can hold K range lines, each of length R. The data memory 53 can hold (M+K) range lines where M is the azimuth correlation length, i.e. M is the number of echoes over which the azimuth correlation must be carried out in order to achieve the required azimuth resolution. The output buffer consists of two parts 57 and 59, each capable of holding K azimuth processed range lines. As examples of suitable values, R could be 5000 M could be 1000, while K could be 64.

The input buffer 51, the data memory 53 and the output buffer are all two-dimensional in structure. The length of all these storage units in the horizontal direction of FIG. 9 is R storage locations, where R is the length of a range line. Range lines are written along horizontal lines in these units. The heights of the input buffer 51, data memory 53 and the output buffer (57,59) are K, M+K and 2K storage locations, respectively. Each storage location can hold one complex sample. The size of a storage location in the output buffer (57,59) may be different, usually larger, because this is used to store processed data.

An azimuth processing cycle is the period taken for the azimuth correlation processor to azimuth process K range lines. This azimuth processed data is stored in the part 57 of the output buffer connected to the data processor 55. Simultaneously, K new range lines are entered into the input buffer 51 of the processor and the K range lines processed during the preceding azimuth processing cycle are extracted from the part 59 of the output buffer connected to the output. At the end of the azimuth processing cycle the K new range lines in the input buffer 51 are transferred vertically i.e. without any horizontal displacement, to the data memory 53 to overwrite the oldest K range lines. The K newly processed range lines are transferred from part 57 to part 59 of the output buffer.

Instead of physically transferring data, the same effect could be achieved by interchanging the roles of the two parts 57 and 59 of the output buffer for the next azimuth processing cycle, i.e. by connecting part 57 to the output and part 59 to the data processor 55. The same idea could be used to avoid the data transfer time between the input buffer and the data memory, by designing the input buffer as a part of the data memory. Then the size of the data memory would be M+2K range lines, each of length R. A section of this, of size (K×R), would be operating as the input buffer 51 and the other section of size (K+M)×R would be operating as the data memory 53, in any given azimuth processing cycle. This input buffer section would be taken as a part of the data memory for the next azimuth processing cycle.

Since new range lines overwrite the old range lines in the data memory 53, this can be visualised as the curved surface of a cylinder of length R and circumference (M+K), with the axis being in the horizontal direction. Range lines are written along horizontal lines of this surface, parallel to its axis. A pointer P indicates the newest range line in the data memory. After each azimuth processing cycle, a block of K new lines are transferred to the data memory 53 from the input buffer 51 and the position of the pointer P is moved vertically along the cylinder by K lines. The rectangular data memory 53 of size (M+K)×R is made to behave as a cylindrical memory 71 by evaluating the vertical address as well as the location of point P, modulo (M+K). The pointer P is initialised to some value, usually zero, at the beginning of the SAR processing operation.

The input buffer 51 can be regarded as the curved surface of a cylinder of circumference R and height K, with the axis in the vertical direction of FIG. 9. The rectangular input buffer shown in FIG. 9 can be made to operate as such a cylindrical input buffer by evaluating the horizontal address modulo R. Range lines are wrapped around this cylindrical buffer beginning from a location indicated by a pointer WR, i.e. successive samples of a range line are stored in successive locations in a horizontal line of the cylindrical memory beginning from the location indicated by WR.

Figure 10A:
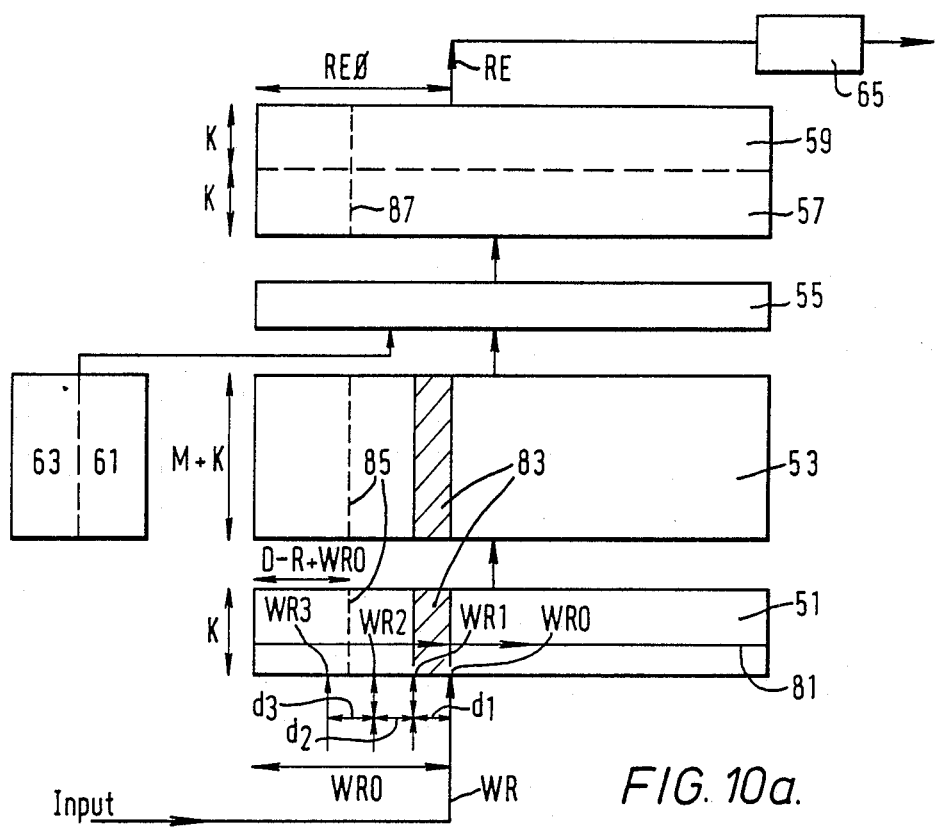
FIG. 10a is a block diagram showing the azimuth processor of FIG. 9 in more detail.
Figure 10B:
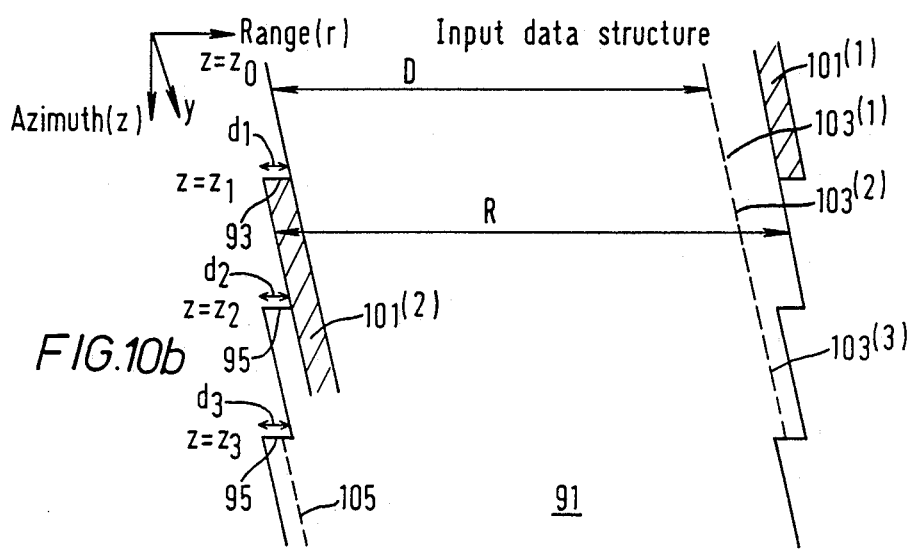

The function of the data processor 55 is now described with reference to FIGS. 10a and 10b. FIG. 10a shows the functional block diagrams of the processor and 10b a typical saw-tooth edged data structure 91 which is entered into the processor. The function of the data processor is to correlate a data sequence of length M+K samples, held in a vertical line 85 in the data memory 53 with an appropriate reference sequence of length M from the coefficient memory 61 to generate K correlated outputs and then store these K outputs along the same vertical line 87 of the output buffer part 57 in line 87. This is carried out for all R vertical lines of the data memory 53. Some of these operations may be carried out in parallel.

Owing to the linear range migration effect, azimuth correlations have to be carried out on data which lie along lines such as 103, parallel to the y-axis in the input data structure. Hence, it is necessary to ensure that these lines of data appear along vertical lines in the data memory, without any discontinuities. Consider the data line 103 of FIG. 10b. If the range lines of the input data structure were written in the input buffer (beginning from the left edge) and then transferred to the data memory owing to the discontinuities 93 and 95 of the saw-tooth edged input data structure, then line 103 would not appear along one vertical line in the data memory 53. The line segment $103^{(2)}$ would be staggered by a distance $d_1$ with respect to the line segment $103^{(1)}$ and $103^{(3)}$ would be staggered by a distance $d_2$ with respect to $103^{(2)}$. Hence the data processor would be unable to process data by correlating along vertical lines of the data memory 53, after passing a discontinuity 93 in the input data structure.

In order to get lines such as 103 along vertical columns 85 of the data memory, the range lines are entered at a variable starting point at the input buffer 51, excess samples after the row is filled being entered at the start of the row thereafter.

The input buffer 51 is a two-dimensional memory of width R and height K. Range lines are written horizontally in this buffer, e.g. line 81. This buffer can be regarded as a circular buffer, or as a surface of a cylinder with a vertical axis, of height K and circumference R. The rectangular buffer 51 is made to appear as a circular buffer by evaluating the horizontal address modulo R.

Range lines 81 are wrapped around this circular buffer, beginning from a location indicated by the pointer WR. These may be wrapped in either direction. However, once a direction has been chosen at the beginning of the SAR processing operation, this direction has to be maintained throughout the operation. For convenience of explanation, it is taken that range lines are written from left to right, beginning from WR, in the input buffer 51 shown in FIG. 10a. Range line data will then be available in this direction in the data memory and the output buffer.

The pointer WR which indicates the start location for a range line 81 may be placed at an arbitrary position at the beginning of the SAR processing operation. Following this, it is moved at every discontinuity in the input data structure, as described below. The point WR is held stationary between discontinuities.

Referring to FIG. 10a, let WR be at the location WRO at time $z=z_0$. This is kept at WRO until the first discontunuity at $z=z_1$ is reached. At $z=z_1$ it is moved left by a distance $d_1$ to WR1, where $d_1$ is the value of the discontinuity at $z=z_1$. From $z=z_1$ to $z=z_2$ the pointer WR is kept at WR1. At $z=z_2$ it is moved by a distance $d_2$ to WR2. Similarly, at $z=z_3$ it is moved by a distance $d_3$ to WR3. With these changes in the write start address pointer it is clear that the line 103, comprising segments $103^1$, $103^2$ and $103^3$, will always appear along the vertical line 85 of the data memory 53. The data memory and data processor will not notice the discontinuities in the input data structure. Hence the data processor can continuously correlate the data located in vertical lines of the memory with appropriate reference sequences, irrespective of discontinuities in the input data structure.

The bands indicated by 83 receive data from the area $101^1$ in the SAR input data structure. This band $101^1$ comes to an end at $z=z_1$. Since the pointer WR is moved to WR1 at $z=z_1$. the area of memory 83 begins to receive data from the new band $101^2$ after $z=z_1$. However, since the azimuth correlation length is M, the data processor cannot produce a valid image from the data in the band $101^2$ until M radar returns have been collected following $z=z_1$. The same applies to lines 103 and 105. The line 103 comes to an end at discontinuity at $z=z_3$. Following this, the place of line 103 in the vertical line of storage locations 85, will be taken up by a new line 105. Since the correlation length is M, the data processor will be unable to provide a valid image sample for line 105 until M samples of these lines are collected along the vertical line 85 of the data memory. It must be noted that this is a physical limitation of the SAR processing operation and not a limitation of the processor.

So far only one type of discontinuity in the input data structure has been considered in the description of the input buffer 51. A general input data structure has been described earlier while describing linear range migration processing and this has been illustrated in FIG. 8. In discontinuities such as 43,44 and 45 in FIG. 8, the pointer WR is moved left and at discontinuities such as 47 the pointer WR is moved right, the amount of movement being equal to the size of the discontinuity. Since the buffer is circular the new value of WR after an increment or decrement operation is always evaluated modulo R. Some of the discontinuities 43,44 and 47 in the input data structure may be caused by range migration whilst others 45 may be caused by changes in the location of the reference window. By moving the pointer WR in this way a continuous line of the input data, such as 49, can be entered into a single vertical column of storage locations in the data memory 53. This allows the data processor 55 to continuously correlate along vertical lines in the data memory 53 irrespective of discontinuities in the input data. Furthermore, when a band of data in the input data structure comes to an end at a discontinuities such as 43, the region in the memory 53 which was receiving this data begins receiving data from a new band in the other side of the image. Also, since every movement of WR is relative to its current location it is not required for the processor to know beforehand the upper and lower boundaries of the total input data structure, provided the swath width at any given instant does not exceed R. Hence, with this new data input architecture the SAR azimuth processor can process data continuously irrespective of any range migration effects and changes in the radar reception window 11.

The azimuth distance between discontinuities, e.g. the distance between 43 and 44 in FIG. 8, is not limited in any way by the azimuth correlation processor described here. It depends on the organisation of the input data structure by the user of the processor. If the slope of the linear range migration is relatively large these discontinuities may have to be placed close to each other to avoid relatively large unprocessed areas in the image. Alternatively, if the slope of the range migration line is changing relatively rapidly with azimuth variable z, these discontinuities may have to be placed relatively close to each other to ensure smooth transition at discontinuities. Although FIG. 8 may give the impression that the slope of linear range migration varies rapidly, in practice these changes occur at a relatively slow rate.

The output buffer shown in FIGS. 9 and 10a consists of two parts 57 and 59. Each of these parts is two-dimensional in structure and of size $(K \times R)$, i.e. it consists of K horizontal lines with each line capable of holding one azimuth processed range line of data. One of these two parts 59 is connected to the output whilst the other part 57 is connected to the data processor 57. In any azimuth processing cycle K range lines of processed data are written into 57 whilst the K lines processed in the preceding azimuth processing cycle are extracted, in range line order, from 59. At the end of this azimuth processing cycle, the contents of 57 are transferred to 59. This may equivalently and more quickly be achieved by swapping the roles of the two parts 57 and 59 of the output buffer, i.e. connecting 59 to the data processor and 57 to the output bus for the next azimuth processing cycle.

The part 59 of the output buffer is a circular buffer of height K and circumference R. Range lines of data are available in this buffer wrapped around it horizontally beginning from a location indicated by the pointer RE. The direction, i.e. right to left or left to right, in which range line data is available in the output buffer, is the same as the direction in which data was written in the input buffer. Referring to FIG. 10a, a vertical line 87 of storage locations in the output buffer receives processed data corresponding to line 103 in the input data structure. Hence, it is clear that the location of the pointer RE has to be changed every time a discontinuity in the input data structure is passed. If, as taken earlier, data is written from left to right in the input buffer, the pointer RE has to be moved left by $d_1$ locations after passing the discontinuity 93. Similarly, after passing 95 it is moved by $d_2$ locations to the left. If the discontinuity is in the opposite direction, e.g. 47 of FIG. 8, the pointer RE is moved to the right, the amount of movement being equal to the size of the discontinuity. The value of the pointer RE is evaluated modulo R because the output buffer is circular.

The pointer RE must be initialised to the same value as WR at the beginning of the SAR processing operation. Following this, the pointer RE is moved by the same distance and in the same direction as WR at discontinuities in the input data structure. However, since there is a latency in the azimuth correlation processor described here, the pointer RE is moved a short time after the corresponding movement in WR.

The processed SAR image is read from the output buffer 59 in range line order, If the output is to have the same structure as the input, i.e. that indicated in FIGS. 8 and 10a, the range lines must be read beginning from the location of the pointer RE and in the direction in which range lines have been stored in the input buffer. However, if a different structure is required for the output, e.g if only a part of the image is required a different method can be adopted for extracting data from the output buffer. In any case the horizontal address for reading range line data must be evaluated modulo R. This is because the buffer 59 is circular.

The processed SAR data obtained from the output buffer 59 will be on the r-y grid shown in FIG. 7b. It is usually desirable to present this data to the user in the original range (r)-azimuth (z) grid shown in FIG. 7a. The data was converted from the r-z grid to the r-y grid in the linear range migration processor 29 solely to simplify processing in the azimuth correlation processor 31. The function of the interpolator 65 in FIG. 9 is to carry out the r-y to r-z co-ordinate transformation, which is the inverse of the operation implemented in the linear range migration processor 29. Referring to FIGS. 7a and 7b, it can be seen that this co ordinate transformation involved interpolating the values of a range line at points P1,P2,P3,P4, etc. in a r-z grid from data available at points Q1,Q2,Q3,Q4, etc. on the same range line. Since the output from buffer 59 of the azimuth correlation processor is available in range line order, this interpolation can be carried out on-the-fly in the interpolator 65. At the output of the interpolator 65 the SAR image is available in a range (r)-azimuth (z) grid. This interpolator 65 can also be made to carry out other resampling operations such as slant-range to ground-range conversion.

In a digital processor it is most economical to implement these storage units 51,53,57,59, 61 and 63 using high density memory components. However, this does not preclude the use of other structures such as shift registers and charged coupled devices for implementing these units. The chosen structure will depend on the technology used.

The function of the data processor 55 in the azimuth correlation processor is to correlate the data contained in vertical lines of storage locations of the data memory 53 with the sequences of coefficients held within the coefficient memory (61,63). This correlation can be carried out using a variety of techniques.

The data processor 55 can implement the correlation using time domain or frequency domain techniques. A suitable technique for correlation in the time domain is described in our United Kingdom co-pending application no. 88 02905 now U.K. Pat. No. 2,215,097. The known frequency domain techniques make use of known transforms such as Fourier and number theoretic. transforms, and fast algorithms for evaluating these transforms such as the known fast Fourier transform (FFT) algorithm. If the FFT algorithm is used to carry out the correlation, the data processor 55 will consist of FFT butterfly processors.

The coefficient memory (61,63) of FIG. 9 contains the reference sequences of length M, required for azimuth correlation. The coefficients of these sequences are generated by the auxiliary processor. Since these coefficients must be updated fairly frequently the coefficient memory is designed in two parts 61 and 63. One of these parts 61 is connected to the data processor and the other to the auxiliary processor. This enables the auxiliary processor 67 to load a new set of coefficients whilst the data processor is processing the SAR data with the old set of coefficients After the loading of a new set of coefficients has been completed and when it is required to use the new set of coefficients it is possible either to transfer the coefficients from part 63 to part 61 or to swap the roles or the parts 61 and 63, i.e. connect the part 61 to the auxiliary processor 67 and 63 to the data processor 55. If the coefficients are not required to be updated frequently, or if high speed SAR processing is not required, it is possible to replace the two parts 61 and 63 of the coefficient memory with a single part which can be connected either to the auxiliary processor 67 or the data processor 55.

Figure 11:
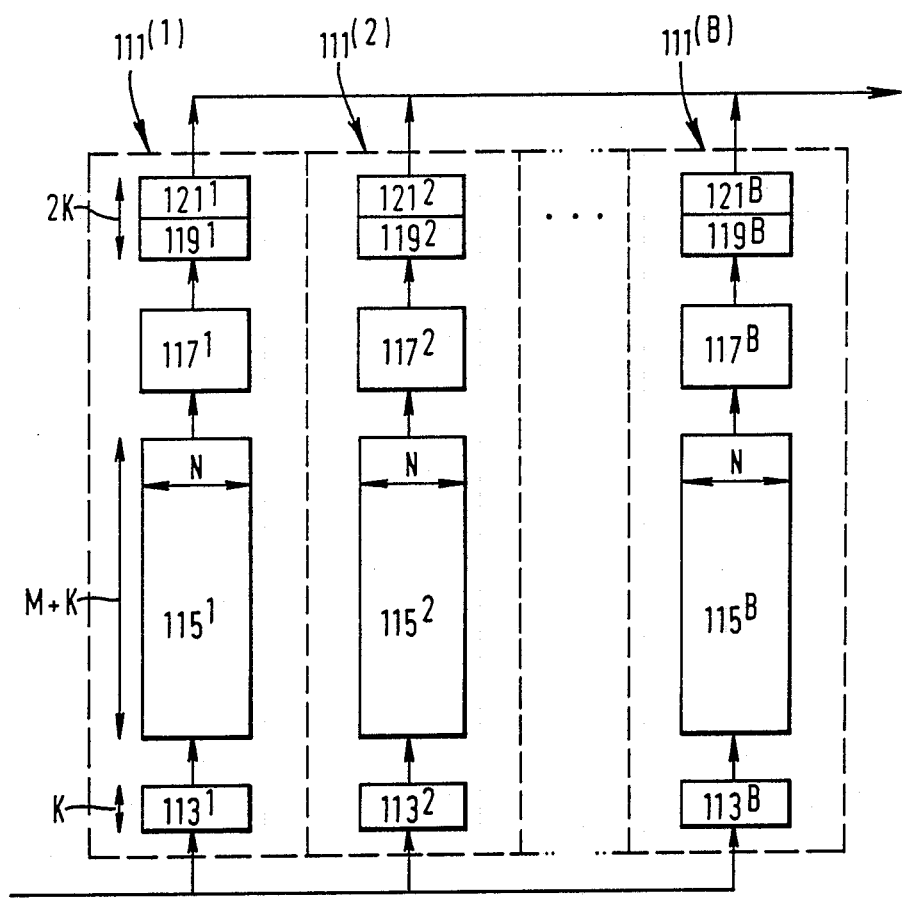
FIG. 11 shows a block diagram of a modular form of azimuth processor.

To achieve modularity in design and other advantages to be described later, the processor shown in FIG. 9 may be partitioned as shown in FIG. 11, into B modules $111^1, 111^2, \ldots, 111^B$. B could be 10. Each of these modules 111 is referred to as an azimuth processing module (APM). The coefficient memory (61,63) and the output interpolater 65 are not shown in FIG. 11. All these modules are identical in structure and of width N, where N is an integer nearest to (R/B) but greater than R/B. However, it is not essential to have all these modules $111^1, 111^2, \ldots, 111^B$ identical, and they may be of different widths $N_1, N_2, \ldots, N_B$. provided $N_1 + N_2 + \ldots + N_B = R$.

The input buffer 51 data memory 53 and the output buffer (57,59) are partitioned into identical and non-overlapping sections 113, 115 and (119,121), respectively, each of width N. These buffers are partitioned primarily for implementation purposes. The structure of these buffers and memories 51,53 and (57,59) and their operation have been described earlier.

Since azimuth processing is carried out on data sequences contained along vertical columns of the data memory 53 of FIG. 9, this memory can be partitioned vertically into sections $115^1, 115^2, \ldots, 115^B$, without any requirements for overlaps between adjacent sections. Furthermore, data can be processed in each APM 111 independently of other APMs. All the B APMs may operate in parallel. For real-time processing each data processing section $117^i$ has to process the N data sequences contained in the N vertical columns of the data memory section $115^i$. generating K processed samples for each of these N sequences in the time taken to enter K new range lines into the input buffer 51.

Figure 12:
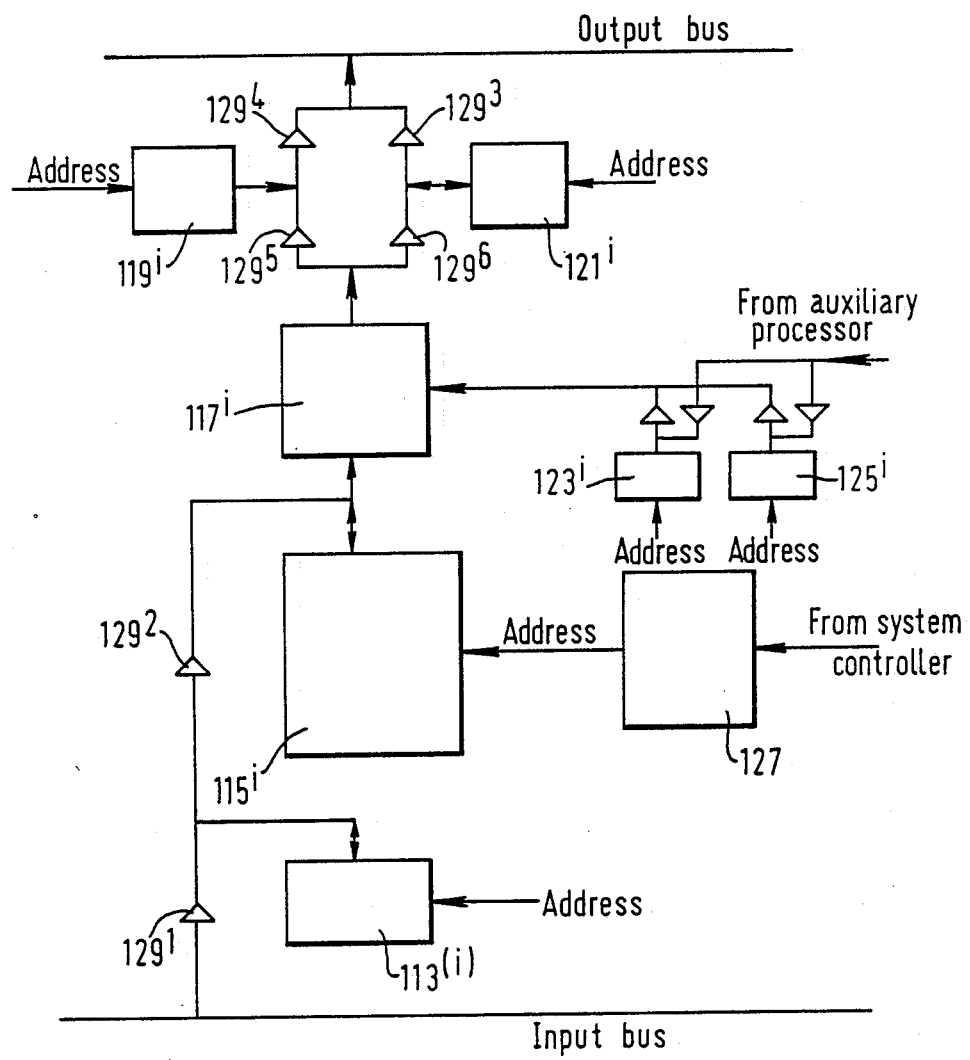
FIG. 12 shows a modified form of connection to the port of the data memory of a processor.

The storage units which form the input buffer $113^i$, the data memory $115^i$ and the output buffer sections $119^i$ and $121^i$ have two data ports, one for writing data and the other for reading data. The APM design can be modified to make use of single-port memory units using tristate drivers, as illustrated in FIG. 12.

A tri-state driver can be controlled either to electrically connect its input to its output or to electrically isolate its output from its input. For example, when the azimuth data processor section 117 is processing data in the memory section 115, the tri-state driver $129^2$ will be controlled such that its output is isolated from its input. All the B APMs can be controlled by a central controller or some local control facilities 127 can be provided for each APM.

Among the advantages of the modular embodiment of FIG. 11 are that design and testing are greatly simplified. Furthermore, since each module can generate a portion of the SAR image in real time, it can be tested under real operating conditions before assembling the modules to form the complete SAR processor. Since the modules can be identical in structure, a module can be tested by comparing its output with that of another receiving the same input data. By providing a redundant APM, each APM can periodically be taken out of service without interrupting the SAR processing operation. This periodic testing of APMS can be carried out automatically by introducing built-in self-test features into each module.

Since all APMs can be made identical, any APM can replace another Since the APMs operate independently, this replacement APM need not be physically adjacent to the APM being replaced Hence if tests reveal a fault in an APM, the faulty APM can be replaced by a redundant APM. The whole test and replace procedure can be automated. Such a system will be capable of reconfiguring itself for fault-free operation while in operation. This feature makes the processor particularly attractive for on board SAR processing.

Another advantage is graceful degradation. Since an APM generates a band of the image, a fault in this APM does not lead to the corruption of the complete image. Since there is a one-to-one correspondence between a band of the image and the APM generating this band, the identification of a faulty band of the image will also indicate the faulty APM, thereby simplifying the fault diagnosis problem.

Since the APMs operate independently, it is not required for the clock signals of all the APMs to be exactly synchronised. It is adequate to maintain good clock signal synchronisation within a module. This simplifies the circuit design problem and allows each APM to be operated at high speeds.

This architecture is also relatively less sensitive to design timing errors. If an APM fails to operate at the designed clock frequency $f_c$, the effect of this is to reduce the number N of vertical lines of data that can be processed by this module. This gets reflected as a reduction in the width of the swath that can be processed in real time. In such an event an additional APM can be inserted to process the complete specified swath.

Since the processor architecture consists of an array of APMs, the swath-width, resolution or the throughput can be increased by increasing the number of APMs in the system. Furthermore, in a fixed hardware design based on the new architecture, the azimuth resolution can be improved by reducing the swath width and vice versa, without any change in the throughput. Alternatively, the throughput of the fixed hardware design can be increased either by reducing the swath-width or the azimuth resolution.

In the SAR azimuth processors described with reference to FIGS. 9 to 11, range lines are written by write address pointer WR into input buffers 51, 113 arranged in continuous form, in that the pointer fills up successive storage locations along an input row to the end of the row, and then fills up storage locations from the start of that row. The number of storage locations is equal to the number of range lines samples so that a fresh line starts to be written in when the pointer returns to its starting position. The data written in is advanced column-wise in the buffer 51, 113 before it is over-written by the next line, or the pointer WR is advanced column wise to the next row. The pointer has a variable starting position to accommodate discontinuities in the input data structure as shown at $z=z_1$ in FIG. 10$b$. In this way the columns represent range migration corrected sets of samples from a series of radar returns, on which azimuth processing is to be carried out.

In an improved embodiment, described now with reference particularly to the modular form of FIG. 11, the range line samples are entered into the data storage locations in a different sequence. This new sequence can perhaps best be explained by considering a simple example of how data could be fed in, in the FIG. 11 embodiment as already described. Imagine that the pointer WR has moved to the first storage location of input buffer module 113$^1$. The data is then entered into the second, third etc. storage locations and progressively fills up the first row of module 113$^1$, continues at the first storage location of the module 113$^2$, progressively fills up the first row of that module, continues at the first storage location of the first row of module 113$^3$, and so on until the whole range line has been entered. The input row is continuous in that the pointer returns to the starting position for the next range line (the first location of module 113$^1$), the line written in being advanced column-wise before it is overwritten. At a discontinuity in the input data structure, the pointer steps to a different starting position.

In the improved embodiment, the first sample of the data line is entered in the first storage location of the first row of input buffer module 113$^1$, the second sample is entered in first storage location of the first row of the second input buffer module 113$^2$, the third sample is entered into the first storage location of the first row of the third input buffer module 113$^3$. The Bth sample is entered into the first storage location of the first row of the Bth input buffer module. The next sample is entered into the second storage location of the first row the first buffer module, the next into the second storage location of the first row of the second buffer module, the 2 Bth sample into the second storage location of the first row of the Bth module, the (2 B+1)th sample in the third location of the first row of the first module, and so on. The last B samples of a range line are entered in the last locations of the first row of each of the buffer modules 113 in turn, and the first B samples of the next range line are entered into the first locations of the first row$ of the buffer modules in turn as before, the last input data being transferred column-wise before it is over-written (or the write address pointer can be advanced column-wise to the next row, and the first B samples of the next range line can be entered in the equivalent locations in the next row). The input sequence is again in continuous form in that the number of storage locations is equal to the number of range lines samples, and the same pattern of entry is repeated. When a discontinuity in the input data structure is reached, the pointer WR steps the appropriate number of positions along the sequence of storage locations, i.e. the order in which they are filled.

The advantage of this new arrangement lies in the azimuth processing procedure.

The columns of data in each module 115 are combined, for example correlated, with sequences of reference coefficients in a coefficient memory (not shown). Thus, in the case of the first data memory module 115$^1$, which since range lines may comprise 5000 samples and there may be 10 modules, may contain 500 columns of data, those columns are fed sequentially, one column at a time, to the processor (e.g. starting at the left-hand side of the modules and working to the right-hand side) together with the appropriate columns of reference coefficients. At the same time, the same procedure happens at the other modules. The values of the columns of reference coefficients depends on the range of the respective sample. 100 columns of reference coefficients may be used across the full length of a range line, i.e. the same coefficient column may be used for 50 data columns in data memory 115.

In the case of the embodiment already described with reference to FIG. 11, the first 50 columns of the first data memory module 115 requires the same column of reference coefficients, and a second column of reference coefficients is required for the next 50 columns of data. The same is true of the other modules, but all the modules require different coeffficients for the first 50 columns, and similarly different coefficients for the second 50 columns, i.e. at any given time the modules are using different reference coefficients. In fact, because the columns represent data on range migration lines which actually traverse across the length of the range lines (and of the imaged swath), different sets of 10 reference coefficient columns are needed for different parts of these range migration lines. Consequently, each module 117 needs access to the full range of, in this case 100 columns of reference coefficients. It is therefore necessary for each module to have an individual coefficient memory containing a 100 columns of reference coefficients to be attached to it.

In the case of the improved embodiment, the data columns are again fed sequentially out of the respective data memory modules 115 and correlated with appropriate reference columns from the reference coefficient column memory. In this case, however, the first data line from each module 115 represents closely spaced positions along the range line and hence require the same reference coefficient column. This same coefficient is in fact used for all the first 5 lines which are sequentially transferred from each data memory module 115 to the respective processing module 117. The next reference coefficient column is then used for all the next 5 lines sequentially transferred from each memory module 115 to the processing module 117. At any given time, all the modules require the same reference coefficient column.

This therefore enables a single reference coefficient memory to be used, connected by tappings from a single bus to each of the processing modules, since they all require the same column of reference coefficient at any one time. This therefore provides a saving in hardware in that only one reference coefficient memory is used for all the modules in the place of one for each module required for the embodiment described herein before.

Further, since the reference coefficient memory is now separate from the processing module it is easier to change it e.g. if it is desired to correlate over a different column length M. Equally, if desired it is now possible to have more sets of coefficients across the line of range line samples e.g. a different set of coefficients could be used for each column of data in the memory modules.

The write address pointer will move along the pattern when there is a discontinuity in a range line e.g. if the discontinuity corresponds to 10 samples, the write address pointer would move from position 1 to position 11, which in the example described above would mean moving from the first space in the first module to the second space in the first module. A discontinuity of 12 samples would mean moving to position 13, i.e. the second space of the third module.

Of course the sequence in which the input data is fed to the input row of the modules may be varied if desired. Some benefit may be gained if the pattern departs from that described. The pattern must, however, go through each storage location to be filled in the same order, i.e. the pattern must be the same each time.

The numbers given for the number of modules, the number of samples in a range line, the number of radar returns for the correlation process, and the number of sets of reference coefficients across the length of the range lines, are of course examples only and different numbers may be used as desired. Equally, it is not necessary for the write address pointer to commence at the first location of the first module, and it could commence anywhere along the sequence.

Although the improved arrangement has been described with reference to the modular memory of FIG. 11, it is also applicable to the integral memory of FIGS. 9 and 10a.

There may be processing advantages in adding a small number e.g. 5 samples of blank data, to each end of a sample line.

Of course the same addressing sequence must be applied to the output buffer 57, 111, in order to reconstruct the original data sample line sequence.

In the embodiments described above, an approximation is made to the range migration curve consisting of several sections of straight line joining various points on the range migration curve (piece-wise linear approximation), and co-ordinate transformation takes place in the linear range migration processor corresponding to each straight line section. Samples are interpolated on lines parallel to each of the straight line sections, and discontinuities process the maximum amount of data. When data is fed to the buffer and to the memory, samples corresponding to the range migration lines, along which azimuth processing has to take place, form columns in the buffer and in the memory.

In the embodiments now to be described with reference to FIGS. 13 to 19, the range migration curve is approximated by a single linear section representing the slope of a line joining points towards each end of the curve. By a co ordinate transformation, samples are interpolated on lines parallel to this single linear section, but azimuth processing cannot be carried out on these lines because of the residual curved component, and azimuth processing in these embodiments is carried out on curves by means of an additional interpolation process, which is described and claimed in our co-pending application Ser. No. 07/233,251 filed Aug. 17th, 1988, now U.S. Pat. No. 4,879,559. Indeed, this procedure can be applied to individual linear sections in the piece-wise linear approximation process referred to above.

Figure 13A:
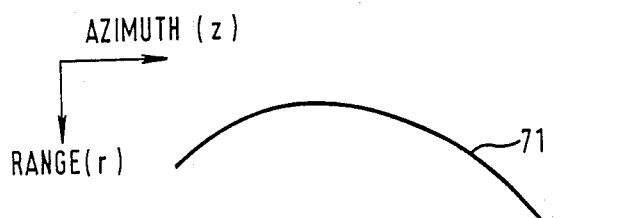
FIGS. 13A, 13B and 13C illustrate certain features of a range migration phenomenon experienced in operation of a modified system.
Figure 13B:
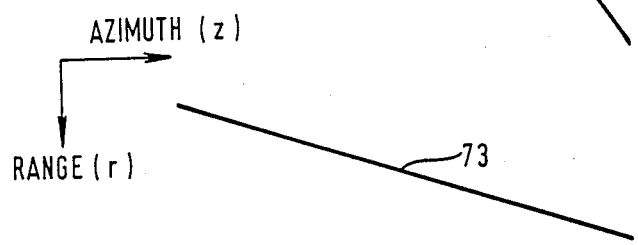
Figure 13C:
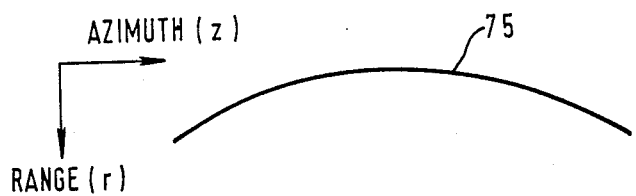
Figure 14:
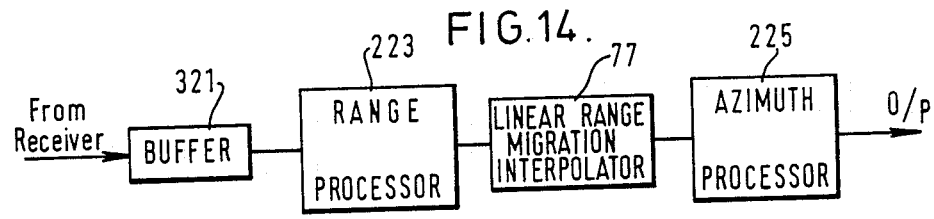
FIG. 14 illustrates the basic arrangement of the modified system.

Referring to FIGS. 13A and 13B, it is known that a range migration effect such as that depicted by line 71 in FIG. 13A can be separated into two components, one linear, as indicated by line 73 in FIG. 13B, and the other non-linear, as indicated by line 75 in FIG. 13C. The linear range migration component 73 may be very large. However, it is known that the residual non-linear component 75 is relatively small. It is also known that range migration correction can be carried out in two stages, the first stage implementing the correction for the linear component 73 of range migration, and the second stage implementing the correction for the residual non-linear component 75 of range migration. The modification to be described effects correction for these two components of range migration separately to enable processing of SAR data with a large amount of range migration. To this end, a linear range migration interpolator 77 is introduced between a range processor 223 and an azimuth processor 225, as shown in FIG. 14. The linear range migration interpolator 77 is a relatively simple arrangement which interpolates data in each range line as data for each line travels from the range processor 223 to the azimuth processor 225.

Referring to FIG. 14, the echo signals received by the antenna (not shown) of the system are detected in a receiver (not shown) of conventional form and converted to digital data signals representing samples of the echo signals of complex form in range line order. The data samples are passed by the way of a first-in-first-out (FIFO) buffer 321 to the range processor 223, the buffer serving to smooth out the data rate over the inter pulse period.

The range processor 223 operates in the same way as does range processor 13 in the first embodiment. Also, linear range migration interpolator 77 interpolates points Q1, Q2, Q3 etc from points P1, P2, P3 (FIG. 15A and FIG. 15B) in the same way as does linear range migration interpolator 29 with reference to FIGS. 6, 7a, 7b.

The interpolated data samples at points Q1, Q2, Q3, etc. of each range line are transferred to the shift register modules 33 of the azimuth processor 225, as they become available at the output of the linear range migration interpolator 77.

Figure 15A:
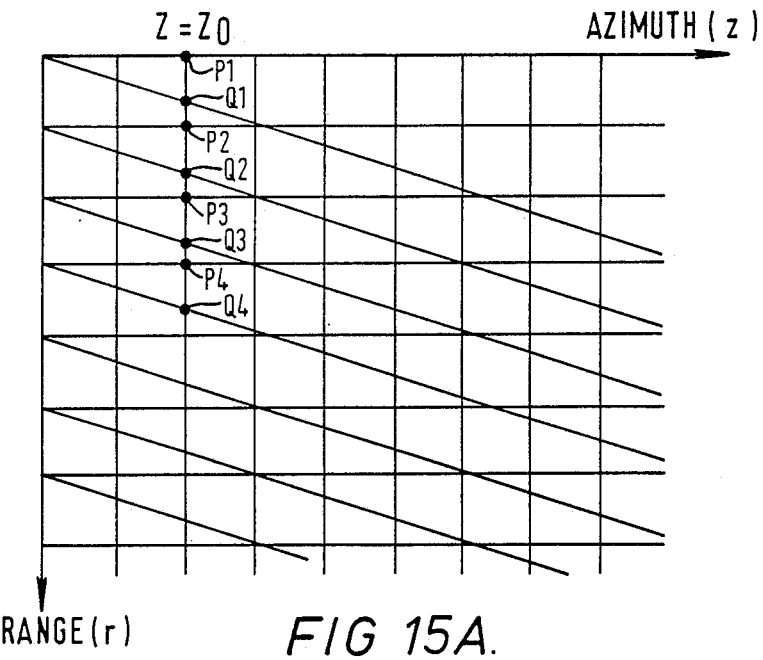
FIGS. 15A and 15B are diagrams illustrating the operation of the modified system.
Figure 15B:
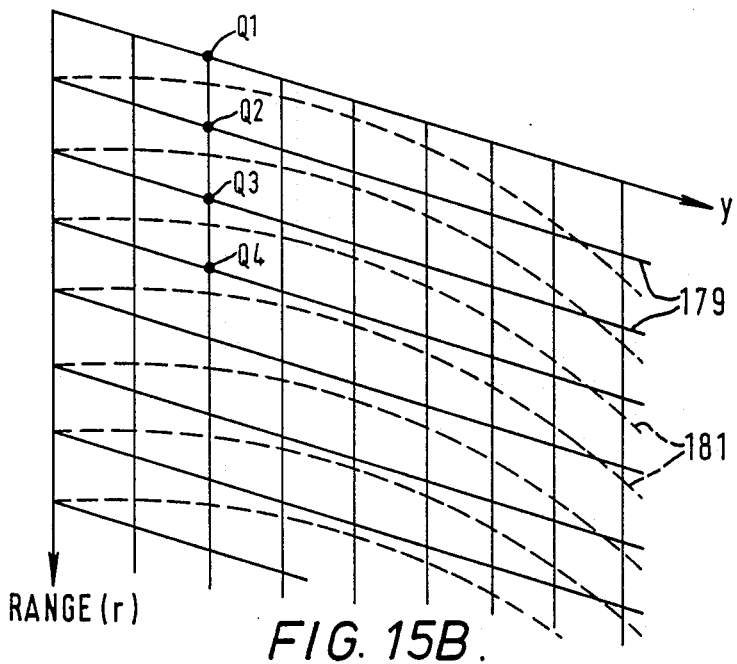

If the non-linear component of range migration 75 is negligibly small, the azimuth processor 225 can carry out azimuth integration by weighted summation of data samples in lines 179 parallel to axis y in FIG. 15B. However, if the non-linear component of range migration 75 is not negligible, the azimuth processor 225 has to carry out weighted summation of samples along the curved paths 181 of FIG. 15B.

If range migration is implemented as described above, with reference to FIGS. 15A and 15B; the SAR data in the included angles between the extreme interpolated data lines parallel to the y-axes and the respective azimuth axes is not processed, and hence an image corresponding to the data in those areas will not be formed.

Figure 16:
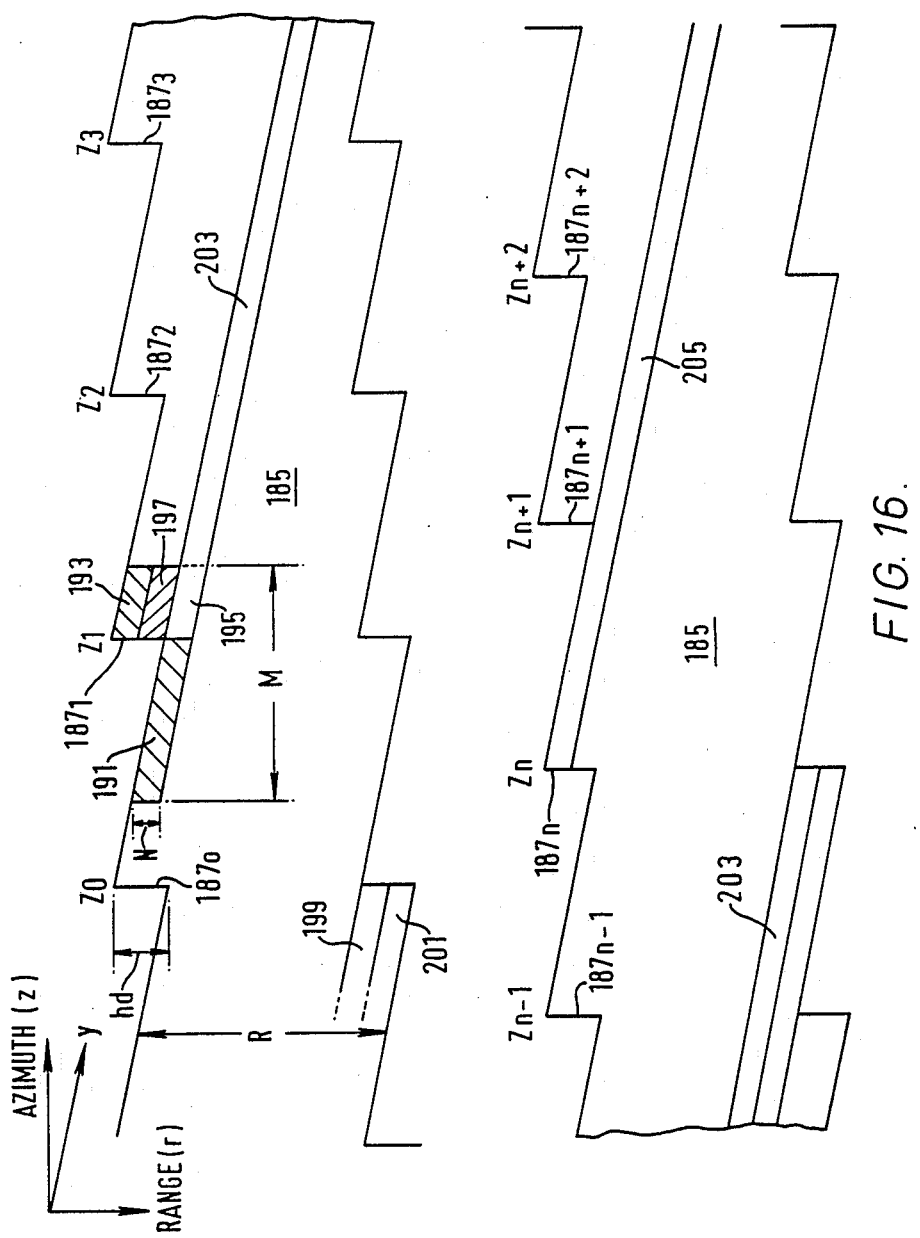
FIG. 16 is a further diagram illustrating the operation of the modified system.

To obtain processing of most of the data in those areas the linear range migration interpolator 77 is modified so that it provides the azimuth processor 225 with interpolated data in a saw-tooth edged region 185 as shown in FIG. 16. However, there then arises a difficulty in processing in the azimuth processor 225 the SAR data at the saw-tooth discontinuities, as indicated by lines $187_0$ to $187_n$ at azimuth positions $z=z_0$ to $z_n$, respectively, in FIG. 16.

Figure 17:
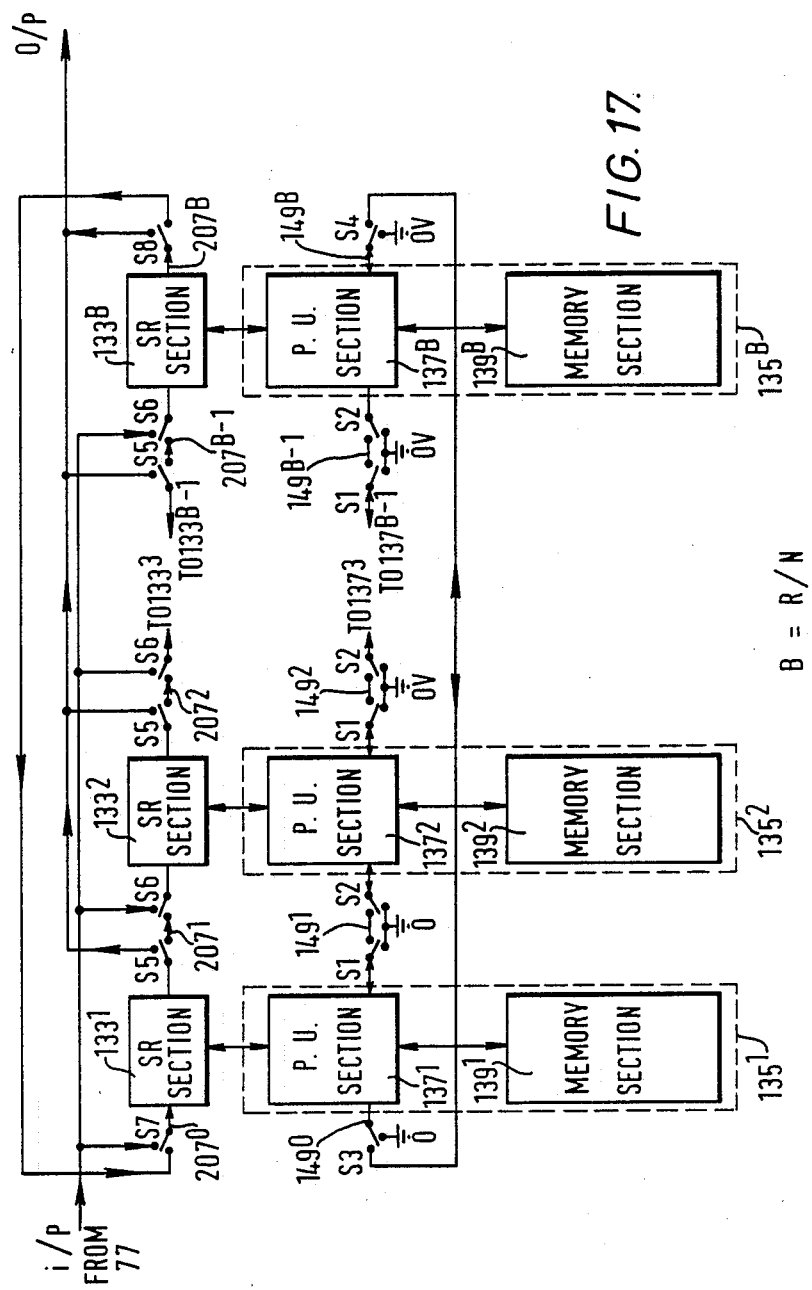
FIG. 17 is a block schematic diagram showing the operation of the azimuth processor of the modified system.

Referring to FIG. 17, the azimuth processor 25 includes an R-stage shift register arranged in modular sections $133^1 \ldots 133^B$, each stage being adapted to accommodate all the bits comprising a single range line sample. The shift register $133^1$, etc. is associated with a memory arranged in modular sections $139^1 \ldots 139^B$ capable of storing $R \times M$ range line samples and a processing unit arranged in modular section $137^1 \ldots 137^B$. The memory 139 is organised so as to be functionally equivalent to a memory in the form of the curved surface of a cylinder.

In operation data for each whole range line is clocked into the shift register 133 from the range processor 223 in turn.

During each processing cycle, which is the time between the start of clocking in of a range line, say i, and the start of clocking in the next line $i+1$, the following operations occur.

First, line i is clocked into the shift register 133 whilst at the same time processed data for range line $(i-M-1)$ is clocked out of the shift register. At this time the memory 139 holds range lines $(i-1)$ to $(i-M)$, and the processing unit 137 utilises this data to calculate processed data for range line $(i-M)$. When this processing is complete, the data for range line i is transferred from the shift register 133 to the memory 139 where it overwrites the data for range line $(i-M)$, and the data removed from the shift register 133 is replaced by processed data for line $(i-M)$ from the processing unit 137.

The data for the next range line $(i+1)$ is then clocked into the register 133 and the processed data for range line $(i-M)$, is clocked out of the register 133, and the cycle repeated.

In an alternative arrangement of the azimuth processor 225, a shift register arrangement using two shift registers may be used, one for data input and the other for data output.

Each shift register section $133^1$ is associated with a respective azimuth processing module (APM) $135^1 \ldots 135^B$, each of which comprises a processing unit sections $137^1$, etc. and a memory section $139^1$, etc.

Each processing unit 37 processes the M rows of $N=R/B$ samples from its associated memory section 39 in order to azimuth process M range lines. However, because of the residual curvature 75 of the range migration, the data in each memory section 139 cannot be azimuth processed. (i.e. correlated with reference coefficients) along columns of data in the memory section. The samples required for azimuth processing must be taken from several columns over the M rows. In fact, unless the non-linear component of the range migration is very small, it will usually be necessary for each processing unit section 37 to take samples from two adjacent memories to complete processing one range migration curve, since the curve itself may be distributed between two adjacent memory sections. The necessary interconnections are shown as 149.

In accordance with the invention of our co-pending application Ser. No. 07/233,251 filed Aug. 17th, 1988, now U.S. Pat. No. 4,879,559 the contents of which are incorporated herein by reference, each processing unit section 137 includes a range migration interpolator in the form of a shift register (not shown) which interpolates samples on the range migration curves. The respective interpolator reads each row of each memory section, and the interpolated samples are generated by a weighting arrangement which operates on a group of the register locations.

In accordance with the present invention, the shift register sections 133 into which the data samples from the linear range migration interpolator 77 are fed, are connected in a ring by means of lines 207, so that the start of each new line can be input at difference positions around the ring. The linear component of the range migration curve is thus dealt with by the linear range migration interpolator 77 and the variable entry/exit points for data, while the residual curved component of the range migration is dealt with by means of the shift register range migration interpolators (not shown) and the interconnections 149. Since the non-linear range migration effect is relatively small, each interpolator can carry out the interpolation to compute values of data samples along the range migration path by obtaining data only from its own memory section and from interpolators of the adjacent APMs.

The difficulty encountered at the saw-tooth discontinuities referred to earlier is dealt with by stepping the input point along the shift register ring by the number of storage locations in the register equal to the height of the discontinuity.

In the arrangement of FIG. 17, each interconnection $149^1$ to $149^{B-1}$ between adjacent interpolators, i.e. between adjacent processing unit sections 137, includes a switch arrangement S1, S2 whereby the interconnection may be established or the interconnection broken and each end of the interconnection grounded. In addition connections $149^0$, $149^B$ are associated with a switching arrangement S3, S4 whereby the connections $149^0$ and $149^B$ may be connected together, or the connection between them broken and each connection $149^0$, $149^B$ grounded. In addition, each link $207^1$ to $207^{B-1}$ between adjacent shift register sections 133 includes a switching arrangement S5, S6 whereby the link may be established or the link broken and the output of the earlier section 133 connected to the output of the shift register as a whole and the input of the later section 133 connected to the input of the shift register as a whole. In addition, the input $207^0$ of the shift register section $133^1$ and the output $207^B$ of shift register section $133^B$ are associated with switches S7, S8 whereby the input $207^0$ is connected to output $107^B$ or the connection is broken and the input $207^0$ is connected to the input of the whole shift register and output $107^B$ is connected to the output of the whole shift register 27.

The switches S1 to S8 are operated by the system controller, to obtain the connection sequence of the processing unit sections 137, and connection sequence of the shift register sections 133 required for processing at any particular time. Thus in the period between $z=z_0$ and $z=z_1$ in FIG. 16, the connection between the input $207^0$ of shift register section $33^1$ and the output $207^B$ of shift register section $133^B$ and the connection between connections $149^0$ and $149^B$ of processing unit sections $137^1$ and $137^B$ are both broken, and all interconnections 149 and links 207 are established. The connections $149^0$ and $149^B$ are then of course grounded, the data from the linear range migration interpolator 77 is entered into shift register section $133^1$, and output processed data is obtained from shift register section $133^B$.

In the period between $z=z_1$, and $z=z_2$, if the height of the discontinuity $h_d=2N$, the link $207^2$ between shift register sections $133^2$ and $133^3$, and the interconnection $149^2$ between processing unit sections $137^2$ and $137^3$ are broken. In addition, the connection between the input $207^0$ of shift register section $133^1$ and the output $207^B$ of shift register section $133^B$ and the connection between connections $149^0$ and $149^B$ of processing unit sections $137^1$ and $137^B$, which were broken during the period between $z=z_0$ and $z=z_1$, are both re-established. The data from interpolator 77 is then entered into shift register section $133^3$ and output processed data is obtained from the shift-register section $133^2$. The period between $z=z^2$ and $z=z_3$, the link $207^4$ and interconnection $149^4$ are broken and the link $107^2$ and interconnection $149^2$ are re-established. Data is then entered into shift register section $133^5$ and the output is obtained from shift register section $133^4$. The procedure is continued to obtain a continuous image of the terrain being imaged. The procedure can easily be adapted for any discontinuity in height $h_d$ which is a multiple of N. In the special case in which $h_d=0$, no linear range migration correction is carried out and all the range migration correction is implemented in the azimuth processor.

Figure 18:
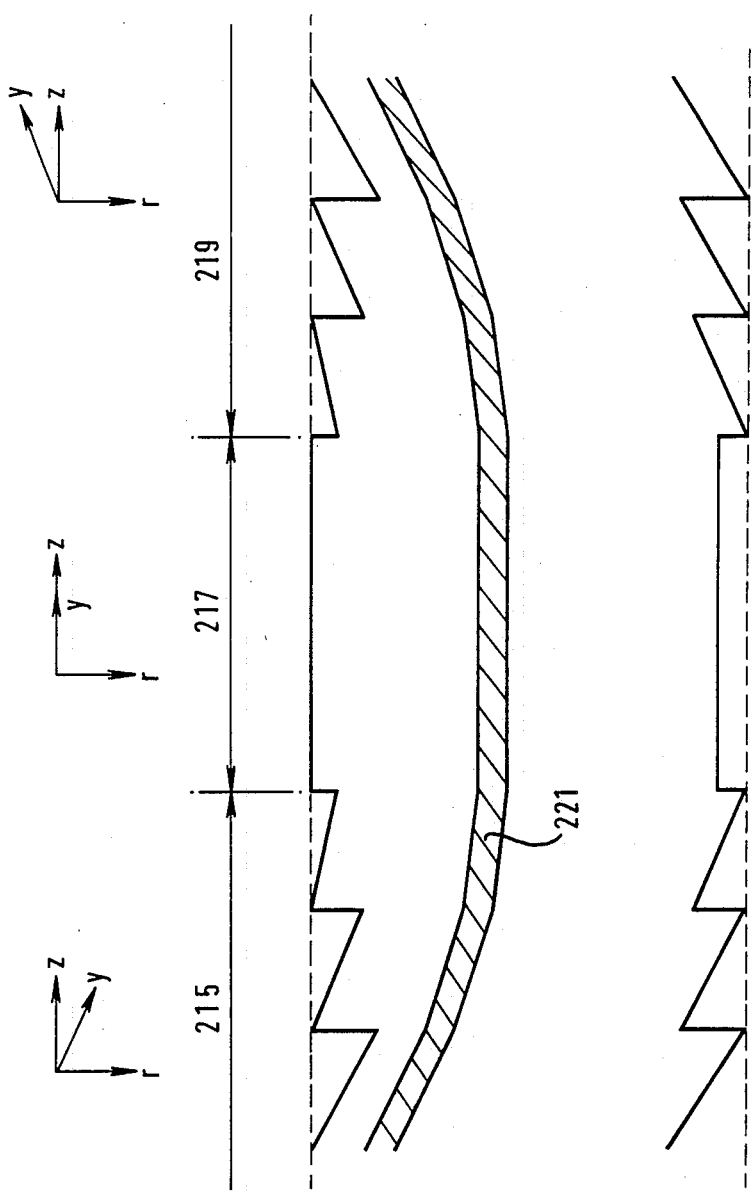
FIG. 18 is a diagram illustrating the operation of the azimuth processor of FIG. 17.

The overall operation of the arrangement of FIG. 17 is illustrated in FIG. 18. The data entry/exit points in the shift register ring rotate in discrete steps so that an APM 135 can process data in strips parallel to the linear component of range migration 73 (i.e. y axis). The strips of data processed by APM $135^\beta$ are marked as 203 and 205 in FIG. 16. The slope of the linear component range migration 73 may change with time. Hence, if the height of the discontinuity $h_d$ is tN, the value of the integer t may also change with time. Since the data/entry exit points are rotated by t APMs 135 at a discontinuity, the speed of rotation of the data entry/exit points around the shift register ring will change with the slope of the range migration line 73. When t changes with time the area of data processed by an APM 135 will consist of a collection of piecewise linear strips 221 as shown in FIG. 18. The slope of the linear component of range migration 73 may be positive, as in the time period 215 of FIG. 18, or may be negative as in the time period 219 of FIG. 18. When the slope is positive the points of data entry/exit of the shift register ring rotate, in discrete steps, in the same direction as the data (in the counter-clockwise direction in the configuration shown in FIG. 17). When the slope is negative the points of data entry/exit rotate in the direction opposite to that of data rotation (in the clockwise direction in the configuration shown in FIG. 17). When the linear component of range migration is quite small, as in the time period 217 of FIG. 18, the points of data entry/exit are not changed. The direction of rotation of the data entry/exit points will change from counter clockwise to clockwise when the slope of the range migration line changes from positive to negative, as shown in FIG. 18. In general, the data entry/exit points in the shift register ring will change such that each APM 135 can process the data provided to it without communicating with any other APMs 135 except the right and left adjacent ones.

The height of the discontinuity $h_d$ between successive data blocks must be an integer multiple t of N. This can be achieved either by changing the width of each data block (all data blocks need not to be the same width) or by changing the slope of the linear component of range migration 73 in discrete steps. The latter does not give rise to any limitations in the amounts of range migration that can be corrected by the processor since any residual range migration effects can be removed using the interpolators 45 in the ring of APMs 135.

Fault tolerance can be introduced in the ring processor of FIG. 17 by using redundant APMs 135 and redundant shift register sections 133 in the ring.

It is apparent from FIG. 17 that for a large swath width, i.e. large value of R, many shift register sections 133 will be connected with the overall data input and output of the whole shift register through switches S1, S6. This can lead to practical design problems. These problems can be avoided by dividing the shift register sections 133 into groups, each group being separately connected to the data input and output paths via registers.

It will be appreciated that there are other methods of reducing the loads on input and output data lines by introducing registers as buffering elements. For example, it is possible to introduce buffering registers to the input and output data lines of FIG. 17 by cutting these lines at several points.

Whilst the invention is particularly applicable to radar apparatus which operates in the microwave region of the electromagnetic spectrum, it is also applicable to other types of radar, for example, acoustic (sonar) or optical radar.

I claim:

1. An azimuth processor for a synthetic aperture radar system, comprising a sequence of data storage locations, means for entering range line samples derived from successive radar echo signals into the sequence of data storage locations, the length of the sequence of data storage locations being selected to accommodate a range line, and a two-dimensional array of storage locations functionally arranged as rows and columns and arranged to receive successive range line samples from the data storage locations into rows of the array, wherein the means for entering the range line samples is operative to enter the samples at a variable starting location along the sequence of data storage locations.

2. A processor as claimed in claim 1, wherein said array is arranged so that each range line transferred to the array is arranged to overwrite the oldest range line in the array.

3. A processor as claimed in claim 1, in which the two-dimensional array of storage locations is divided into array modules, each of which accommodates at least one column of data, the sequence of data storage locations is divided into modules, and each array module is arranged to receive range line samples from a respective data storage location sequence module.

4. A processor as claimed in claim 1, in which the rows and columns of the two-dimensional array have relative lengths which are variable.

5. A processor as claimed in claim 1, further including a trisate driver, and wherein the two-dimensional array comprises a memory unit having a single port coupled to the tristate driver so as to be operable as an input port and an output port.

6. A processor as claimed in claim 1 in which the sequence of data storage location constitutes part of an input buffer separate from the two-dimensional array.

7. A processor as claimed in claim 1, further comprising an output sequence of storage locations arranged to receive azimuth processed data, the output sequence of storage locations constituting part of a buffer separate from the two-dimensional array.

8. A processor as claimed in claim 1 including a linear range migration interpolator coupled to the sequence of data storage locations for interpolating samples on a co-ordinate axis system, wherein one axis is skew compared to a range/azimuth co-ordinate axis system, the interpolator feeding samples to the sequence of data storage locations.

9. A processor as claimed in claim 1, including means for azimuth processing with reference coefficients samples interpolated along range migration curves.

10. A processor as claimed in claim 8 wherein the interpolator is arranged to interpolate samples on two or more coordinate axis systems having different skew axis angles.

11. A processor as claimed in claim 1, further including processing means coupled to the two-dimensional array for azimuth processing the samples in the array with reference coefficients along columns.

12. A processor as claimed in claim 11, wherein said processing means includes means for correlating or convolving columns of length $M+K-1$ with reference sequences of length M to produce columns of processed samples of length K, K and M being variables.

13. A processor as claimed in claim 12, including means for transforming K rows at a time of samples from the sequence of data storage locations to the two-dimensional array.

14. A processor as claimed in claim 1 wherein the sequence of data storage locations comprise a plurality of modules, and successive range line samples are fed in turn to a location in each said module.

15. A processor as claimed in 1 wherein the sequence of data storage locations form a row, and the means for entering range line samples is arranged to enter the samples sequentially to the end of the row and then from the beginning of that row.

16. An azimuth processor for a synthetic aperture radar system, comprising means for performing a coordinate transformation on range line samples derived from successive radar echo signals, successive range line samples defining a range migration curve, the processing means including interpolating means for interpolating the samples on a skew axis of sawtooth form parallel to a straight line approximation of the range migration curve; and processing means coupled to said performing means for azimuth processing the transformed range line samples so that discontinuities in the sawtooth form of data are transparent to the processing means.

17. A processor as claimed in claim 1, further including an output sequence of storage locations arranged to receive azimuth processed data, means coupled to the output sequence of storage locations for reading azimuth processed range line samples from the output sequence of storage locations, the reading means being operative to read the samples at a variable starting location along the sequence of output storage locations.

* * * * *